(12) United States Patent
Davis et al.

(10) Patent No.: US 7,359,832 B2
(45) Date of Patent: Apr. 15, 2008

(54) METHOD OF TIME-IN-SERVICE RELIABILITY CONCERN RESOLUTION

(75) Inventors: Tim Davis, Warwick (GB); Andy Moynihan, Essex (GB); Trevor Sparrow, Essex (GB); Robert Morrison, Ann Arbor, MI (US); Gary Stork, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 725 days.

(21) Appl. No.: 10/875,131

(22) Filed: Jun. 23, 2004

(65) Prior Publication Data

US 2005/0289380 A1 Dec. 29, 2005

(51) Int. Cl.
*G06F 19/00* (2006.01)

(52) U.S. Cl. ............ 702/185; 702/184; 702/187; 702/81; 705/7

(58) Field of Classification Search ......... 702/185, 702/35, 81, 184
See application file for complete search history.

(56) References Cited

U.S. PATENT DOCUMENTS

| | | |
|---|---|---|
| 4,970,725 A | 11/1990 | McEnroe et al. |
| 5,586,252 A | 12/1996 | Barnard et al. |
| 5,608,845 A | 3/1997 | Ohtsuka et al. |
| 5,761,093 A | 6/1998 | Urbish et al. |
| 6,035,715 A | 3/2000 | Porter |
| 6,223,143 B1 | 4/2001 | Weinstock et al. |
| 6,253,115 B1 | 6/2001 | Martin et al. |
| 2001/0032103 A1* | 10/2001 | Sinex ............. 705/4 |
| 2002/0078403 A1 | 6/2002 | Gullo et al. |
| 2002/0082736 A1 | 6/2002 | Lech et al. |
| 2002/0120490 A1* | 8/2002 | Gajewski et al. ........ 705/10 |
| 2003/0033093 A1* | 2/2003 | Nelson ............ 702/34 |
| 2003/0149590 A1* | 8/2003 | Cardno et al. ........ 705/1 |
| 2003/0171897 A1* | 9/2003 | Bieda et al. ........ 702/185 |
| 2004/0103121 A1* | 5/2004 | Johnson et al. ....... 707/200 |
| 2004/0225475 A1* | 11/2004 | Johnson et al. ....... 702/185 |
| 2005/0138477 A1* | 6/2005 | Liddy et al. ........ 714/38 |
| 2005/0149289 A1* | 7/2005 | Whaling et al. ....... 702/181 |

FOREIGN PATENT DOCUMENTS

JP 04-027614 A 1/1992

* cited by examiner

*Primary Examiner*—Hal Wachsman
(74) *Attorney, Agent, or Firm*—Gary Smith; Brooks Kushman P.C.

(57) ABSTRACT

The present invention comprises a method determining a corrective design for a system component exhibiting time-in-service reliability concerns. The method comprises the steps of establishing a plurality of remote customer databases for collecting service data for a system component, receiving at a centralized database during a predetermined period of time at least one parameter representative of a failure rate for the system component based at least in part on the service data and determining if the at least one parameter represents a system component defect. When the at least one parameter represents a system component defect, the method includes determining at least one failure mode of the system component based at least in part on the at least one received parameter and determining a corrective design for the system component based at least in part on the at least one failure mode.

17 Claims, 14 Drawing Sheets

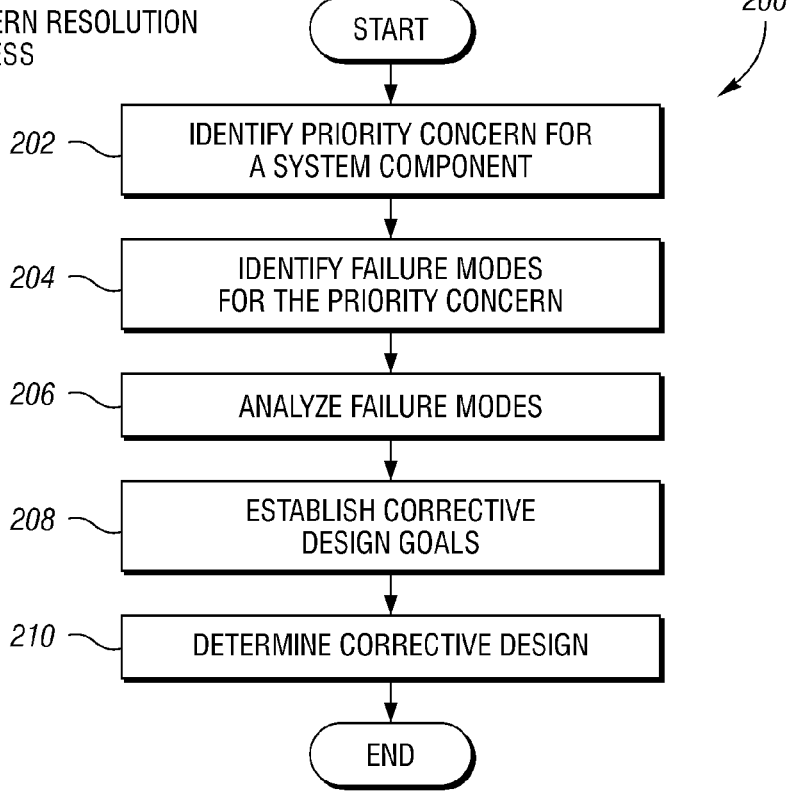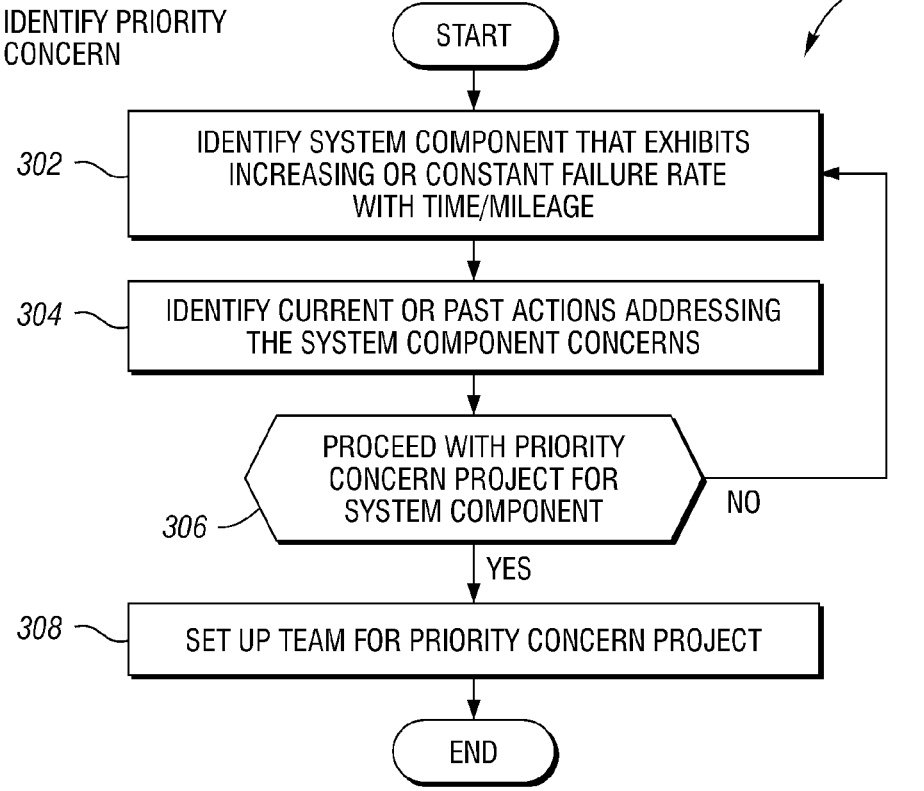

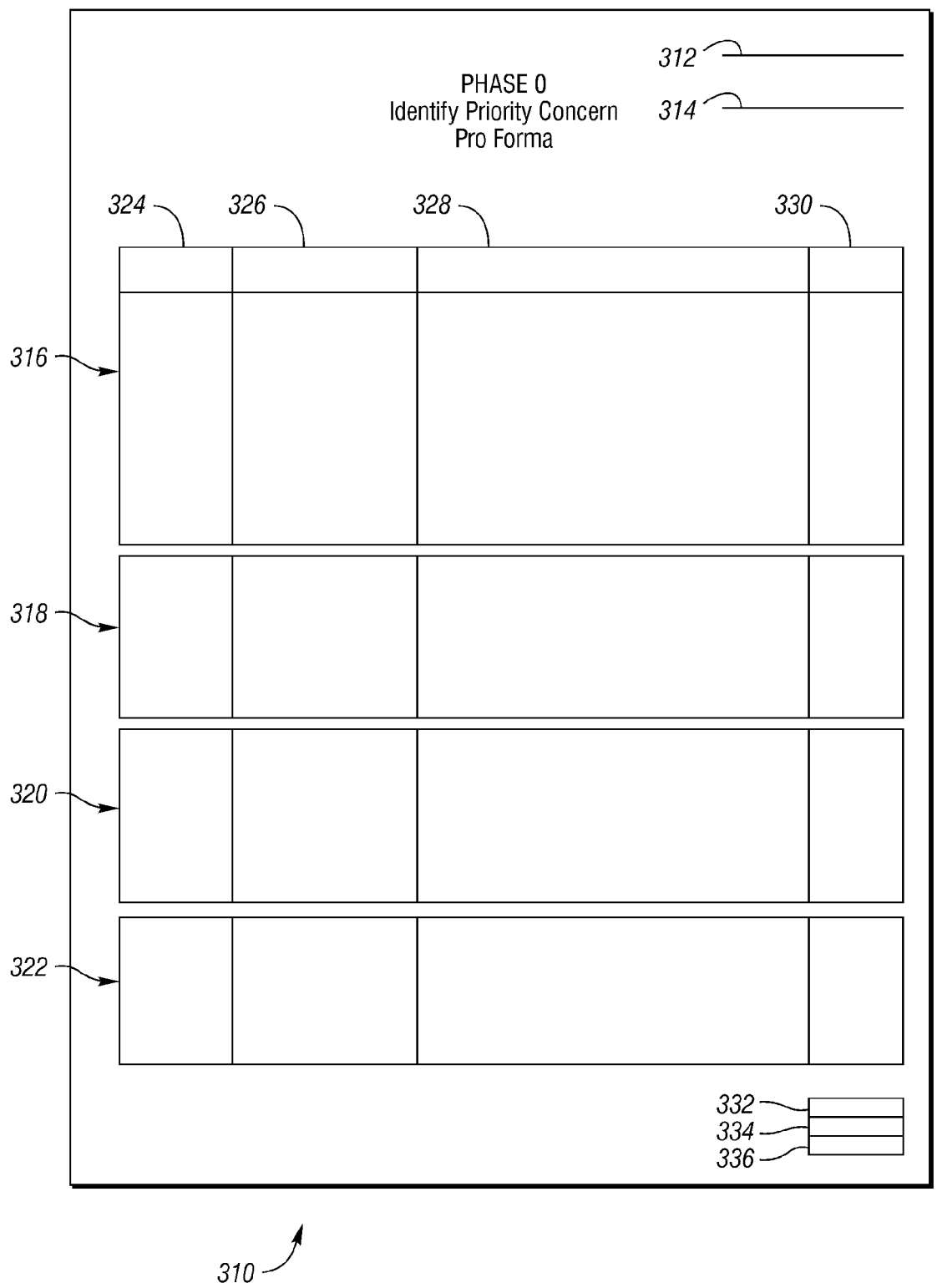

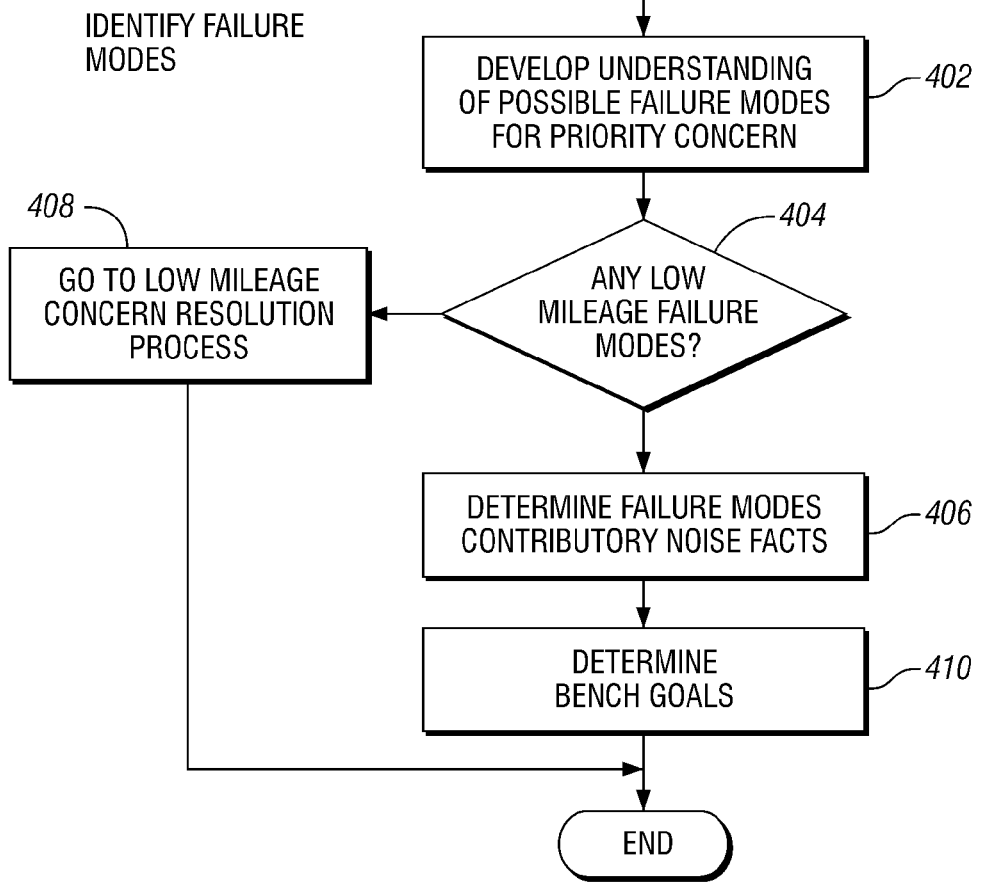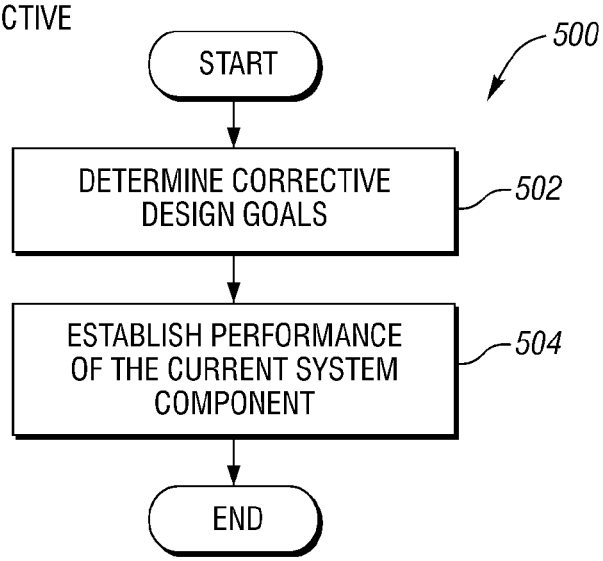

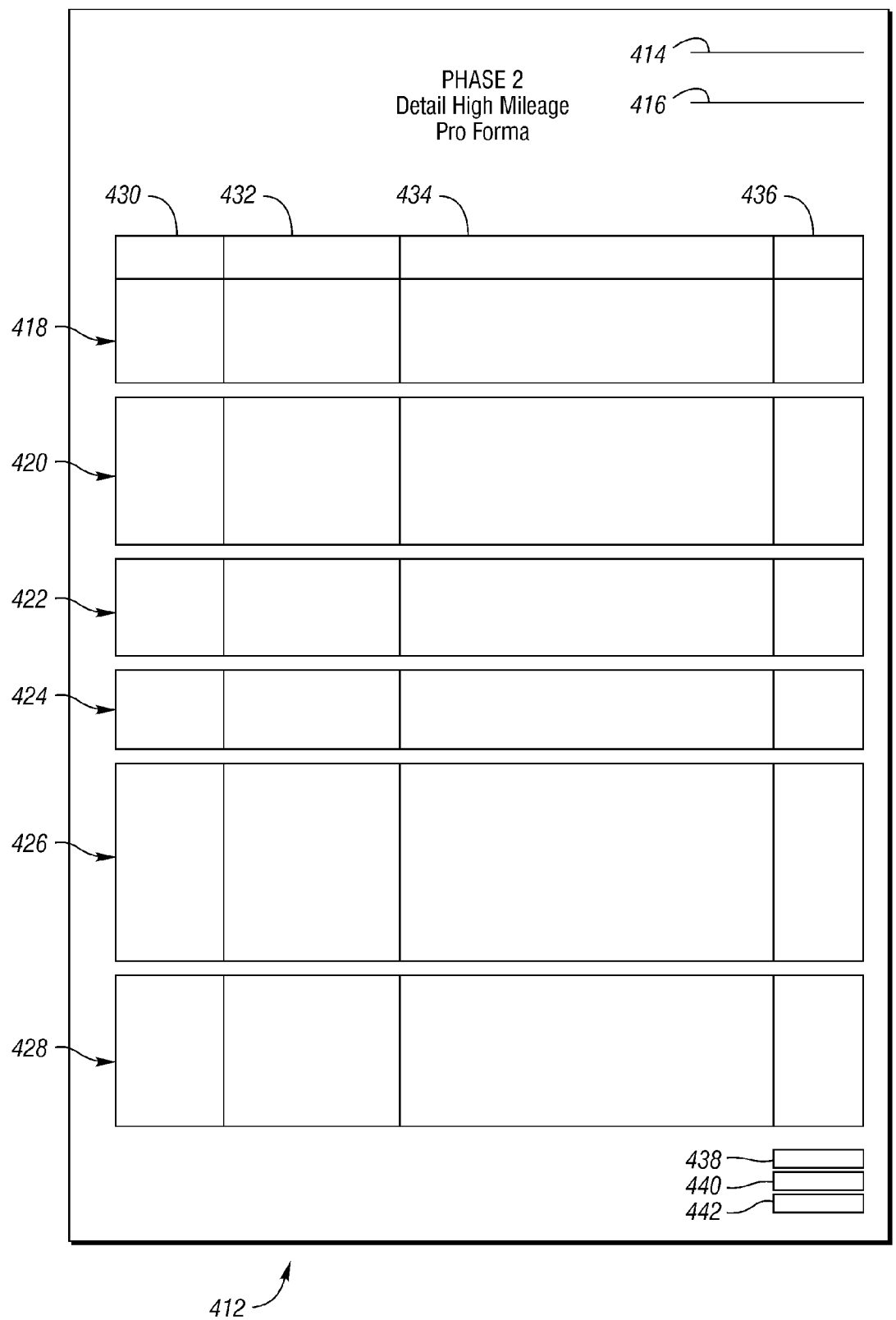

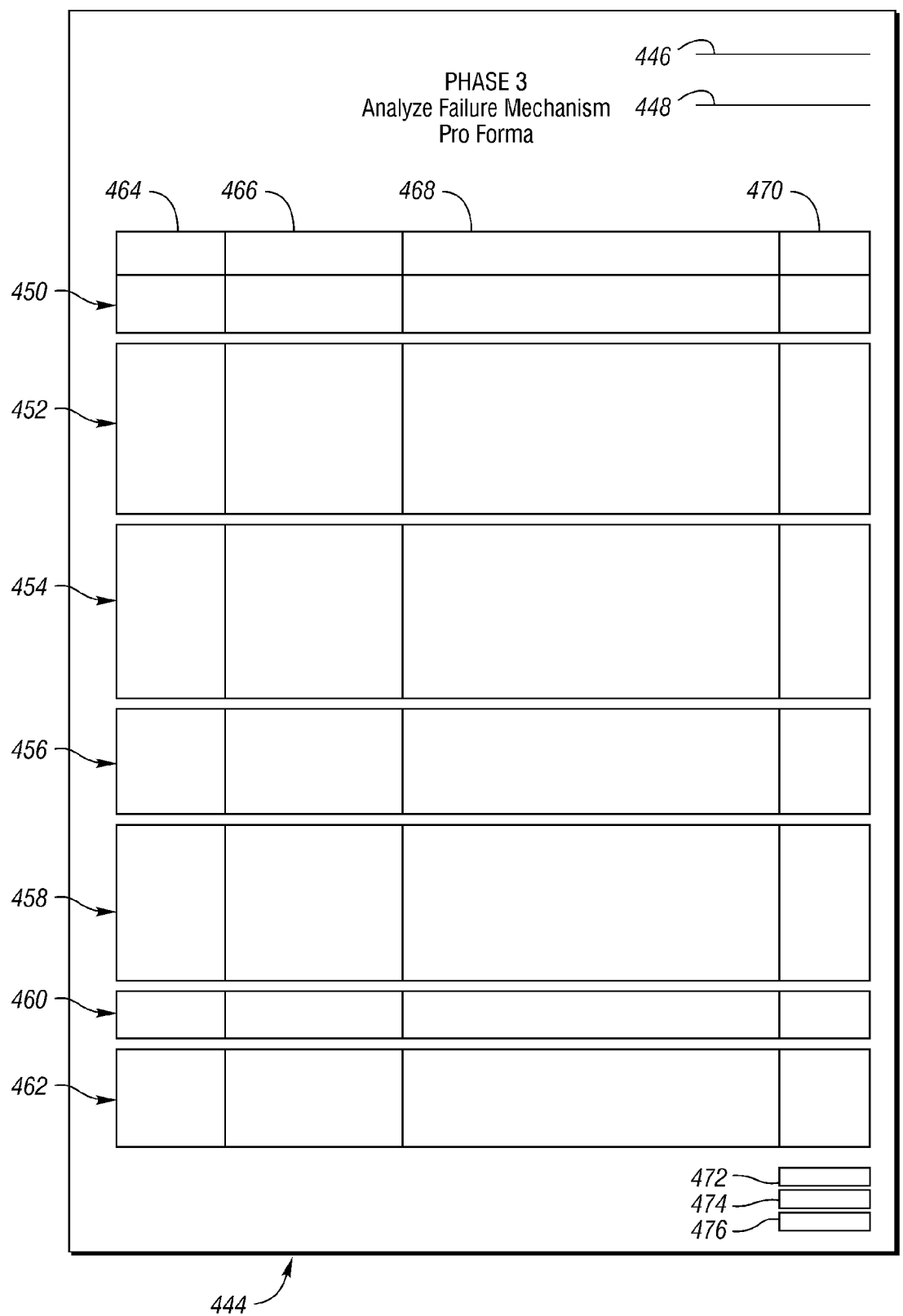

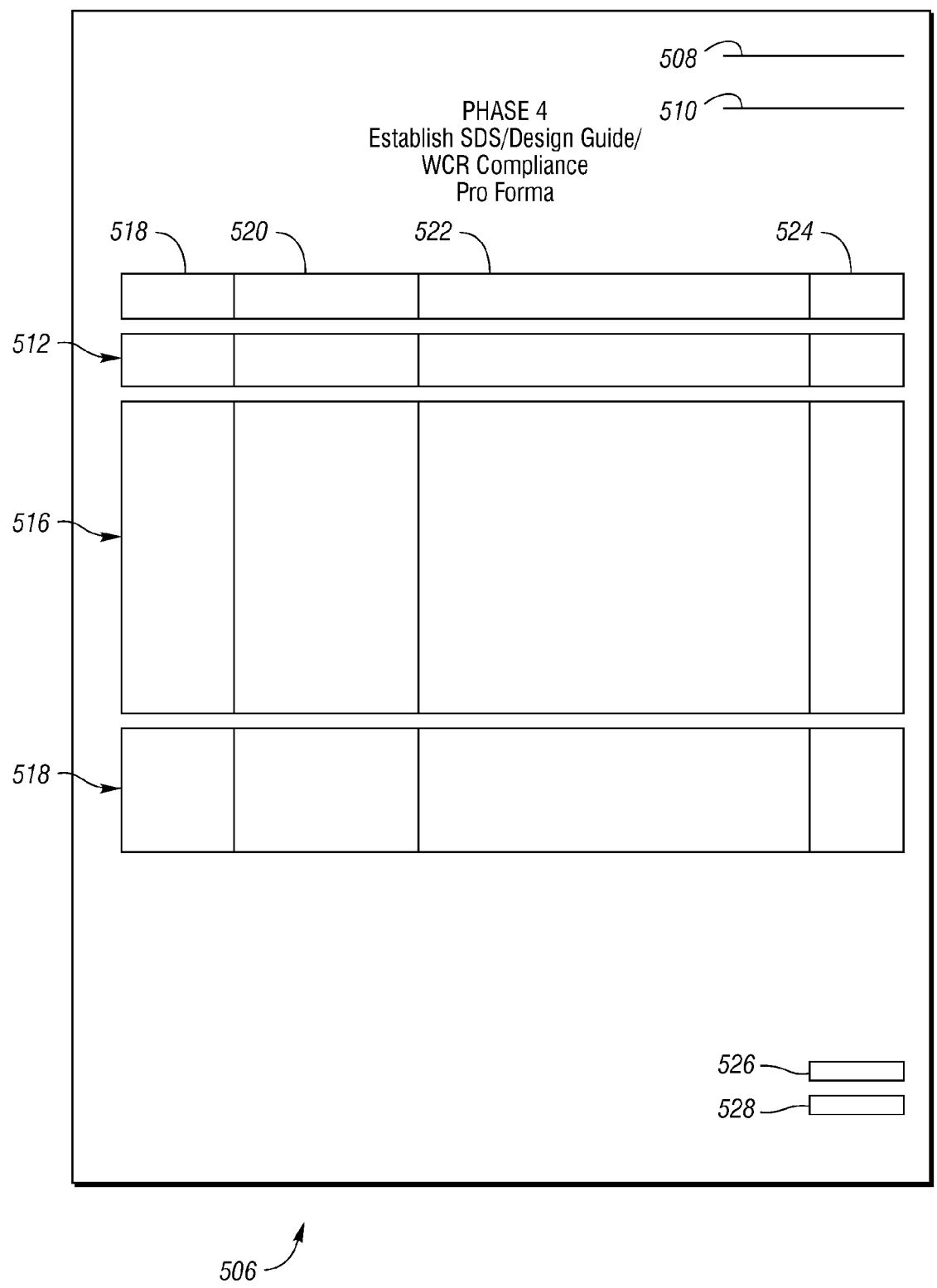

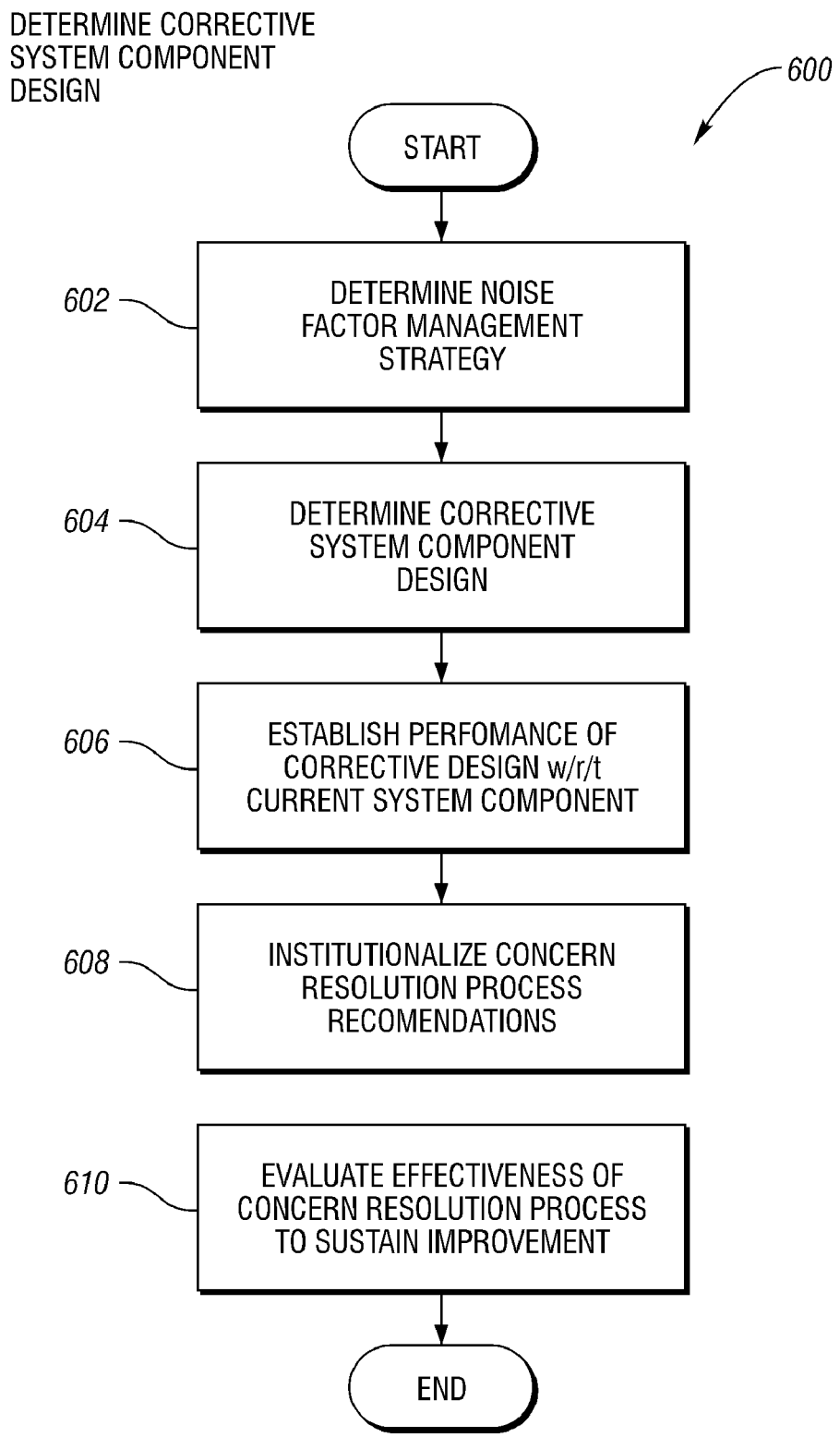

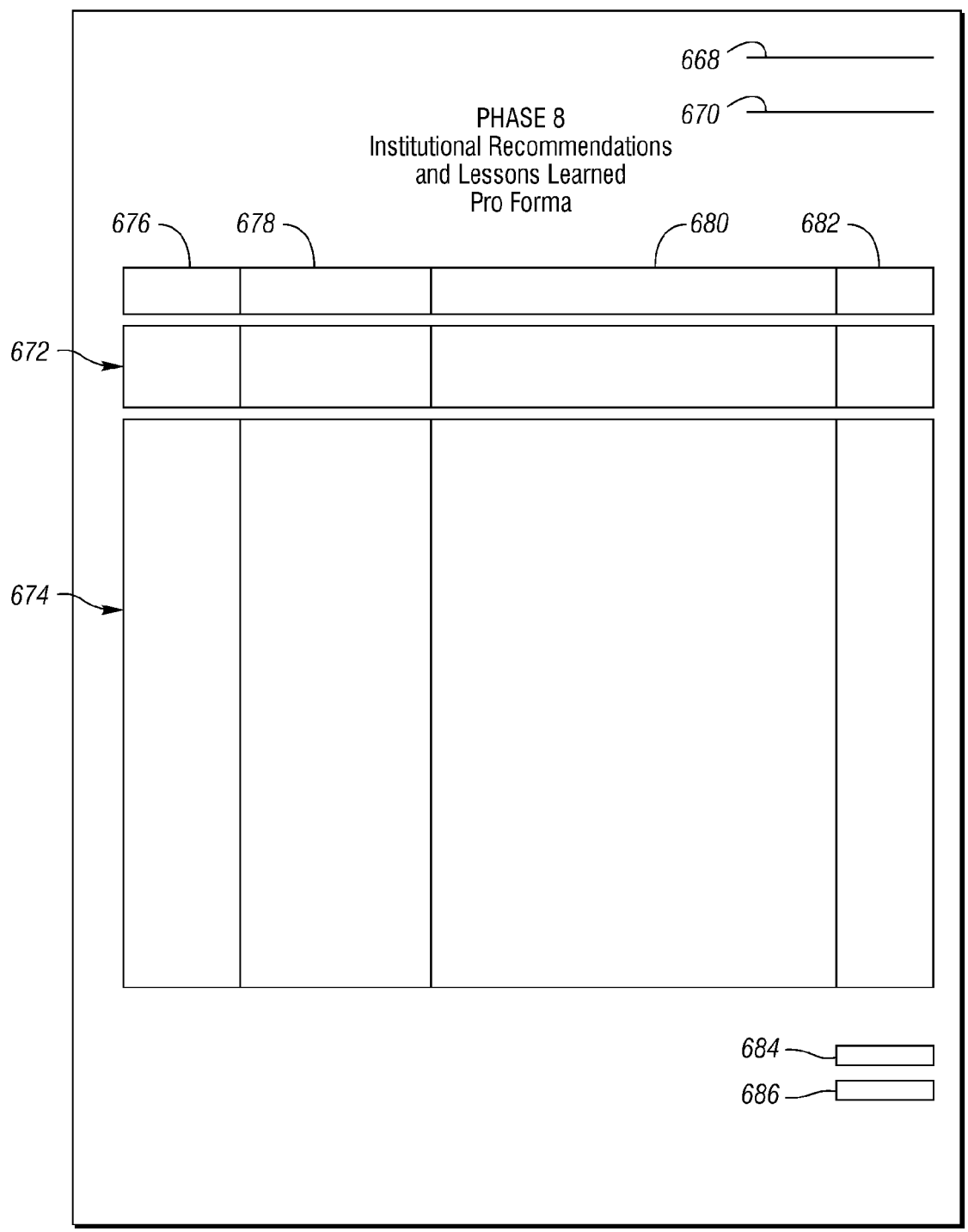

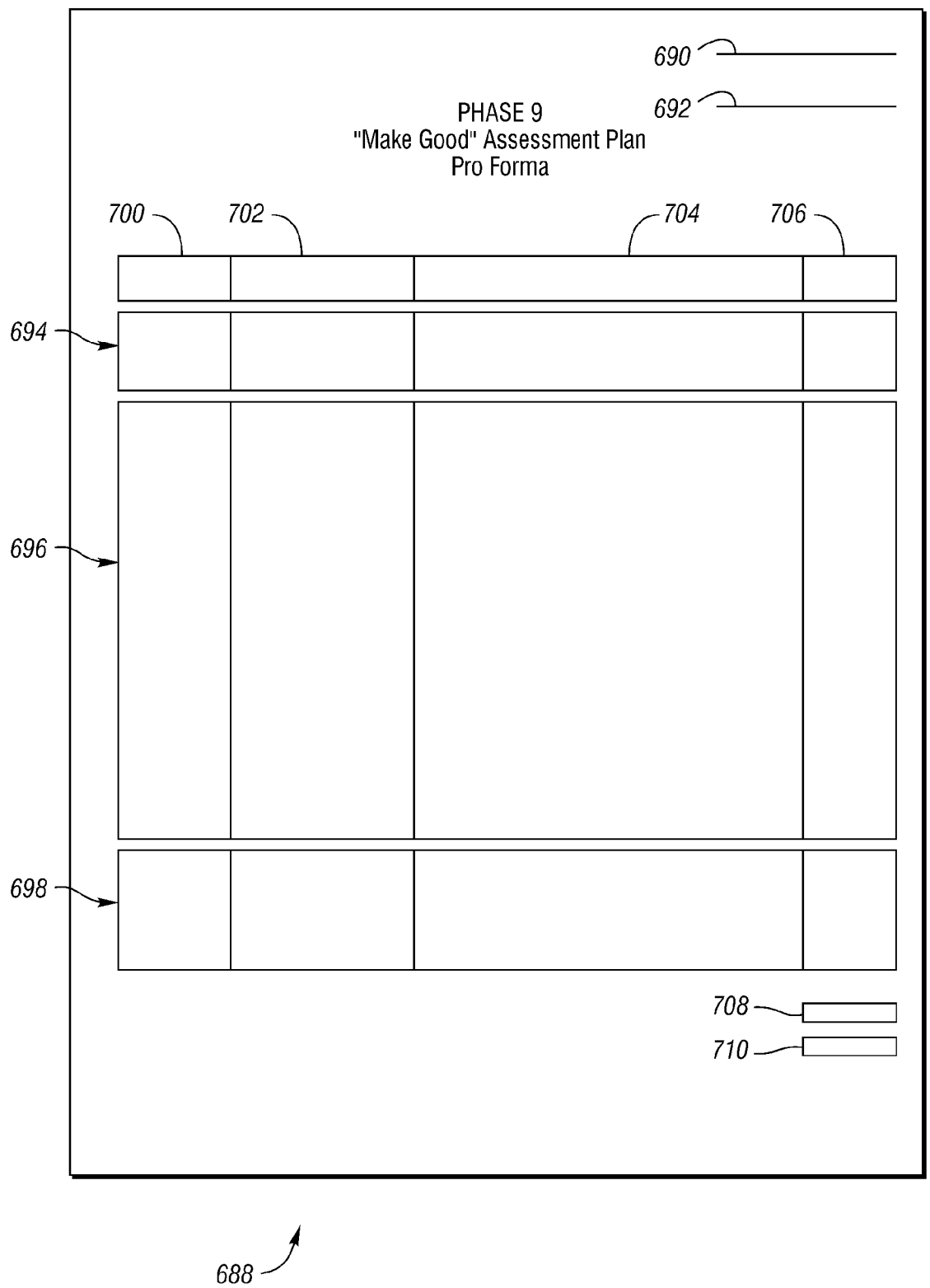

US 7,359,832 B2

METHOD OF TIME-IN-SERVICE RELIABILITY CONCERN RESOLUTION

BACKGROUND OF INVENTION

The present invention relates, generally, to the field of system component reliability and, more specifically, to methods for addressing system component time-in-service reliability concerns.

The modern automobile customer expects an automotive product that meets or exceeds high reliability standards throughout the product's life-span at a cost that represents value. A customer's long term experience with an automotive product will, over time, influence customer satisfaction, reliability reputation, customer loyalty and thus, product resale values and repeat product sales. For automobile manufacturers, the monitoring of extended time-in-service performance (typically measured in mileage) of an automotive system component and the ability to address reliability concerns early in a product lifecycle may be of further economic advantage by contributing to reductions in warranty expenses. Therefore, automobile manufacturers have long sought to monitor extended time-in-service or "high mileage" system component performance in order to improve the reliability of automotive systems. As such, various methods have been developed to identify system component reliability concerns and to understand their causes. After the analysis of reliability concerns, system component performance criteria can be established to better address long term concerns and give engineers performance benchmarks for the development of corrective design solutions. One drawback of this approach is that the time necessary to compile high mileage reliability data makes tailoring corrective design solutions to empirical data impractical.

U.S. Patent Application Publication No. 2002/0078403 discloses a reliability assessment program for compiling and analyzing failure rate data for an automotive or aircraft system component that is unrelated to a corrective design process. The similarity analysis method compares the degree of similarity between an in-service system component and a newly designed system component to determine a failure cause model for predicting the failure rate of the new design. While this invention is useful for its intended purposes, it predicts the failure rate of a newly designed system component, which may or may not be related to the previous in-service system component, only after the new design is completed. Therefore, the invention is not intended as a process for designing a new system component based on the reliability concerns of the previous in-service system component.

As such, it is desirable to have a method of identifying and addressing time-in-service reliability concerns for components that constitute complex systems such as automotive or aircraft systems. In particular, there is a need in the art for a method that addresses time-in-service concerns for system components exhibiting constant and increasing reliability concern rates over a long range time-in-service period. Constant and increasing reliability concern rates have been shown to negatively influence long term customer satisfaction and thus, brand quality perception. There is a need in the art for a method for establishing the reliability of a system component exhibiting constant or increasing reliability concern rates in a reasonable amount of time so the results of such a method may influence corrective design considerations. There is also a need in the art for a method of determining a corrective design for a system component based on the established benchmark performance of a "best-in-class" system component, defined as a system component exhibiting the lowest reliability concern rates in comparison to comparable system components for a particular application. Finally, there is a need in the art for a method for predicting the improvement in reliability of a corrective system component design over that of a previous system component design before the corrective system component goes into service.

SUMMARY OF INVENTION

Briefly described, the present invention comprises a method including associated apparatuses and systems, for addressing time-in-service reliability concerns for system components that constitute complex systems.

The present invention provides a method of addressing time-in-service reliability concerns for a system component. In one embodiment, the method comprises the steps of establishing a plurality of remote customer databases for collecting service data for a system component, receiving at a centralized database during a predetermined period of time at least one parameter representative of a failure rate for the system component based at least in part on the service data and determining if the at least one parameter represents a system component defect. When the at least one parameter represents a system component defect, the method comprises determining at least one failure mode of the system component based at least in part on the at least one received parameter and determining a corrective design for the system component based at least in part on the at least one failure mode.

Other advantages of the present invention will become apparent upon reading and understanding the present specification when taken in conjunction with the appended drawings.

BRIEF DESCRIPTION OF DRAWINGS

The invention will be more readily understood from a reading of the following specifications and by reference to the accompanying drawings forming a part thereof, wherein an example of the invention is shown and wherein:

FIG. 2 illustrates a flow diagram of the concern resolution process according to one embodiment of the present invention;

FIG. 3A illustrates a flow diagram for identifying a priority concern system component according to one embodiment of the present invention;

FIG. 3B illustrates a pro forma form for displaying inputted data according to FIG. 3A;

FIG. 4A illustrates a flow diagram for determining at least one failure mode of a system component according to one embodiment of the present invention;

FIG. 4B illustrates a pro forma form for displaying inputted data according to FIG. 4A;

FIG. 4C illustrates a pro forma form for displaying inputted data according to FIG. 4A;

FIG. 5A illustrates a flow diagram for establishing at least one corrective design goal for a system component according to one embodiment of the present invention;

FIG. 5B illustrates a pro forma form for displaying inputted data according to FIG. 5A;

FIG. 6A illustrates a flow diagram for determining a corrective system component design according to one embodiment of the present invention;

FIG. 6D illustrates a pro forma form for displaying inputted data according to FIG. 6A;

FIG. 6E illustrates a pro forma form for displaying inputted data according to FIG. 6A;

Figure 1:
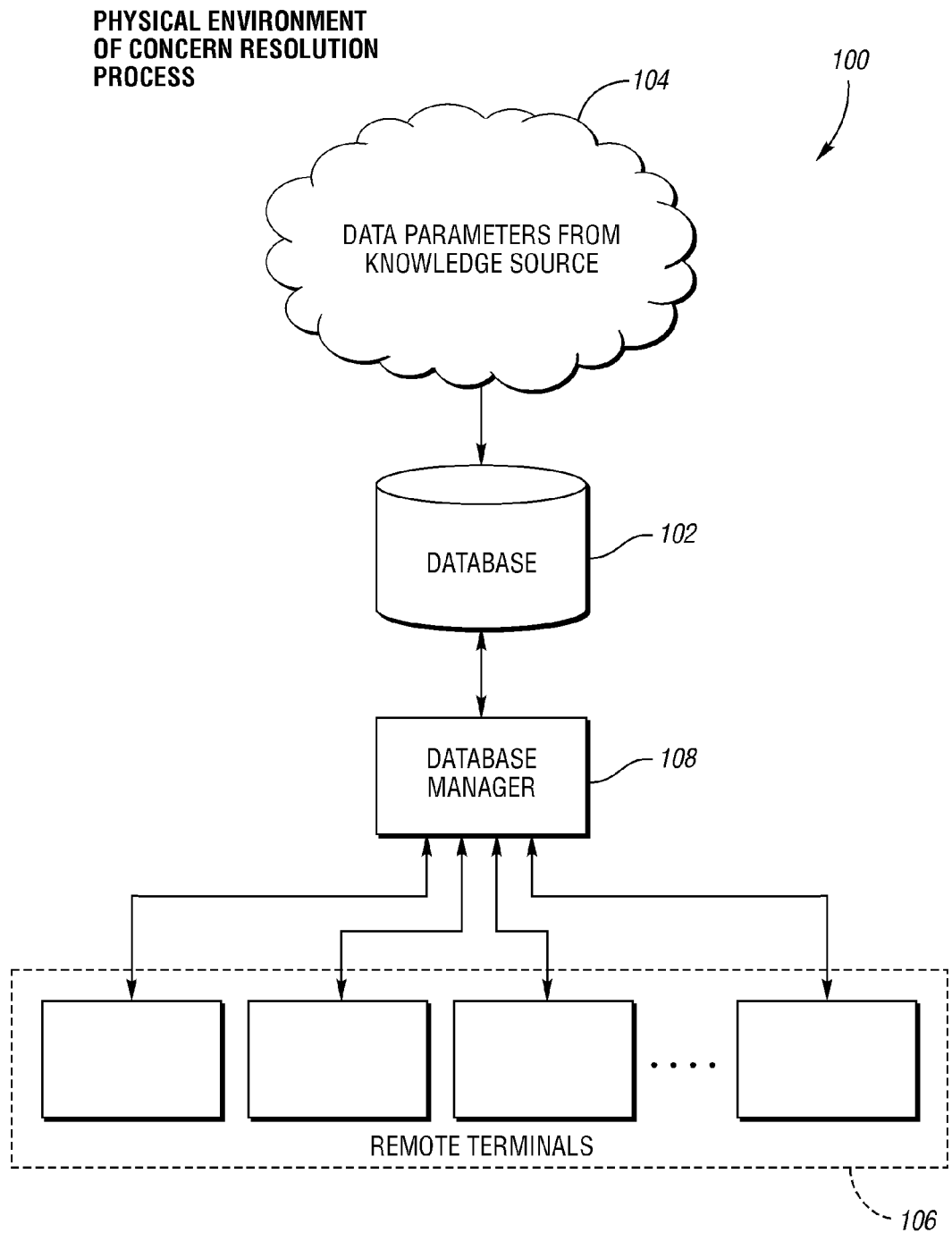
FIG. 1 illustrates a block diagram of the time-in-service reliability concern resolution process according to one embodiment of the present invention.

The construction designed to carry out the invention will hereinafter be described, together with other features thereof.

DETAILED DESCRIPTION

Referring now to the drawings in which like numerals represent similar elements or steps throughout the several views, a method of time-in-service reliability concern resolution is described herein. The present invention is a proscriptive process for determining a corrective design for a system component exhibiting long range time-in-service failure rates. For the purposes of this description, a system component is assumed to be an automotive component, such as a suspension bushing or a valve lifter that is integrated into an automotive system such as a passenger car or truck. However, one skilled in the art will note that a system component suitable for the purposes of the present invention may be any mass produced or specially manufactured component and that such a component may be integrated into a variety of aeronautical or land transportation applications, as well as other complex applications for which repair service and other failure rate data is kept by a network linking remote customer databases. The remote customer databases may comprise stations or depots where the servicing of system components is carried out. These locations may include automotive dealers, garages, service stations, hangers or the like.

For the purposes of the present invention, a system component failure rate is determined by service data for a system component that indicates failures to be steady or increasing over a predetermined time period. The predetermined time period is a time period sufficient for statistically predicting a long range time in service system component defect given a sampling of data from a plurality of remote customer databases. In one embodiment of the present invention, the predetermined time period is three years in service ("3YIS").

Referring to FIG. 1, the physical environment of the present invention 100 comprises a centralized database 102 operable to store service data parameters 104 obtained from the remote customer databases described above or knowledge sources internal and external to a system component design process. The database 102 may be comprised of various types of memory for storing data including read only memory, random access memory, electronically erasable programmable read only memory and keep alive memory. The service data parameters 104 may include system component repair records, service department sales of replacement system components, system component design and manufacturing data, customer surveys and other records regarding the design or field performance of the system component or other system components that interact with the system component. The service data parameters 104 may also include knowledge from suppliers, in-house engineers, outside engineers and technicians who design or assemble the system component or install the system component into an automotive system.

In operation, the service data parameters 104 from a plurality of remote customer databases are electronically received by the centralized database 102. The centralized database 102 is electronically accessible from a plurality of remote terminals 106 which are electronically communicative with the centralized database 102 via a database manager 108. The database manager 108 may be a database management software program which includes pro forma forms for each phase of the present invention, as will be described in detail below. One such database management software program suitable for use with the present invention is the REDPEPR® software program, but other suitable database management programs will be well known to those skilled in the art. The operations of the database manager 108 may also be performed by a plurality of users or users in concert with a database management software program. Therefore the foregoing description should not be construed to limit the performance of the functions of the database manager 108 to electronic means, user-implemented means or any combination thereof.

The present invention generally includes steps for determining a corrective design for a system component. These steps, which are described in FIG. 2 below, are designed to address constant or increasing system component failure rates resulting from normal usage, defects or the like. In particular, the present invention provides a process for determining system component improvements or replacements. As such, the present invention includes the steps of identifying a time-in-service concern for a system component, identifying at least one possible failure mode associated with the time-in-service concern, analyzing at least one failure mode associated with the time-in-service concern, establishing at least one corrective design goal based on the analysis of the at least one failure mode and developing a corrective design that addresses the system component time-in-service concern.

FIG. 2 displays an overview flowchart representation of a method 200 of the database manager 108 according to embodiments of the present invention. The elements of the method 200 will be described for particular embodiments of the present invention in FIGS. 3A-6E below. The method 200 comprises identifying at the database manager 108 a time-in-service priority concern for a system component in step 202. Step 202 includes identifying constant or increasing system component failure patterns in collected service data parameters 104 over a predetermined time-in-service period. The collected service data parameters 104, from the remote customer databases described above, may include data associated with defects due to customer usage, environmental conditions, system to system interaction, wear, fatigue, manufacturing or the like. Step 202 includes determining if the failures observed are in fact due to high mileage or time-in-service factors, therefore constituting a "system component defect" for which a corrective design is necessary.

Next in step 204, the method 200 comprises identifying at the database manager 108 at least one failure mode of the priority concern. The identification of the at least one failure mode includes statistically determining whether an identified failure mode is a low or high mileage/time-in-service failure mode, identifying benchmarks for analyzing the technical characteristics of an identified failure mode and determining at least one contributory "noise factor" associated with an identified failure mode. A contributory noise factor can be defined as including an external condition that may contribute to, or cause, a system component failure mode.

In step 206, the method 200 comprises analyzing the at least one failure mode to determine the possible causes of failure for the system component. Step 206 includes the analysis of failure mode noise factors to further determine the technical characteristics of a failure mode. Step 206 also includes analyzing a failure mode to identify potential fast track solutions for determining a corrected system component design.

Continuing to step 208, the method 200 comprises the establishment of new design goals for the corrected system component design that will replace the current, in-service system component design. Step 208 also includes identifying contributory noise factors that result from non-compliance with predetermined system component requirements. As such, step 208 includes determining a test for reproducing a contributory noise factor as it occurs in the field and identifying actions needed for noise factor management.

In step 210, the method 200 comprises determining the corrective design for resolving a time-in-service reliability concern for the system component. In particular, step 210 includes developing a corrective design for a system component based at least in part on mitigating the at least one failure mode, as will described in further detail below. Step 210 also includes determining a test for verifying the performance of the corrective design with respect to the original system component design and/or an identified best-in-class system component design.

Figure 3C:
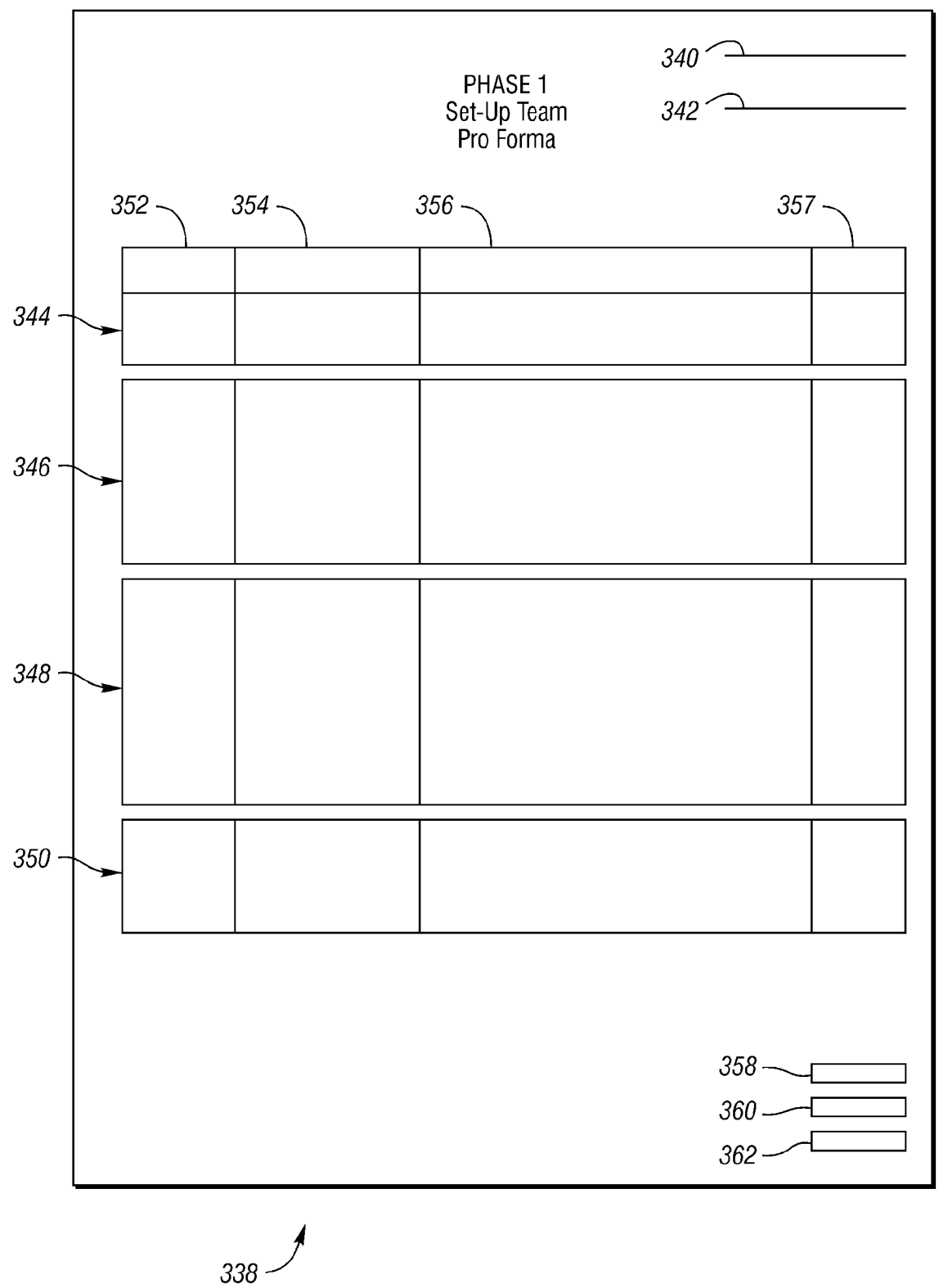
FIG. 3C illustrates a pro forma form for displaying inputted data according to FIG. 3A.

FIGS. 3A, 4A, 5A and 6A display flowchart representations of the various elements or sub-methods of method 200 performed at the database manager 108 according to the preferred embodiments of the present invention. As such, FIG. 3A illustrates a flowchart representation for a method 300 of identifying a priority concern system component according to embodiments of the present invention. In this method, which is generally represented by step 202 above, the database manager 108 identifies a system component that exhibits constant or increasing failure rates that are associated with time-in-service or high mileage as a priority concern in step 302. The database manager 108 may identify a system component as a priority concern from collected service data parameters 104 received by the database manager 108 from various remote customer databases and analytical tools. The service data parameters—104 may comprise repeat repair record data, customer satisfaction report data, service part sale data and the like, as described in FIG. 1 above. In one embodiment of the present invention, compiled data parameters may comprise warranty cumulative hazard and reliability analyses of system component high mileage failures. Next, in step 304, the database manager 108 identifies current or past actions addressing the priority concern for the system component. At step 306, the database manager 108 determines whether to proceed with a priority concern project for the system component. If the database manager 108 determines that a priority concern project is not necessary, the database manager 108 will return to step 302 for identifying another possible priority concern. If the database manager 108 determines that a priority concern project is necessary, the database manager 108 determines a team for implementing the priority concern project. As such, a team leader and team membership may be identified. In one embodiment of the present invention, a dedicated management team makes the decision to jointly agree on proceeding with a priority concern project. The database manager 108 comprises pro forma forms for displaying priority concern project data according to method 300 as seen in FIGS. 3B and 3C.

FIG. 3B illustrates pro forma form 310 for inputting or displaying priority concerns. Form 310 includes lines 312 and 314 for inputting or displaying a chief engineer sign-off and date and quality director or manager sign-off and date, respectively. According to FIG. 3B, the purpose of pro forma form 310 is to identify priority systems and components on which to form teams and initiate projects. The identification of priority concerns is considered to be phase 0 of this embodiment of the present invention.

Form 310 includes input boxes for several subphases of phase 0, i.e., input box 316 for phase 0.1, input box 318 for phase 0.2, input box 320 for phase 0.3, and input box 322 for phase 0.4. According to FIG. 3B, each input box includes four columns 324, 326, 328 and 330. Column 324 represents deliverables for each subphase. Column 326 captures or displays the tasks, data sources, and analysis tools and whether each of these have been completed or are unavailable for each subphase. Column 328 allows the user to input or display results and comments regarding the deliverables. More specifically, the user can enter a "yes" and if the user enters a "yes" in regard to a task, data source or analysis tool that was used, supporting documentation can be included as an attachment to the form. If "no" is entered, an explanation is entered into the input box under column 328. Column 330 captures or displays a deliverable completion due date. Under column 330, input boxes 332, 334 and 336 are provided for inputting a generic timing for completion, plan completion date and actual completion date, respectively.

With respect to phase 0.1, an example of a deliverable can be a system and/or component that exhibits increasing failure rate with time and/or mileage identified as a priority to be worked on. Column 326 for this subphase can include occurrences per one-thousand, repeat repairs, CPU, TGW, customer Sar, breakdowns, cost per repair, service part, sales, fleets, JD power, severity, and others.

With respect to phase 0.2, an example of a deliverable can be warranty cumulative hazard and reliability function analysis of high mileage failures documented. For this subphase, time-in-service, mileage, and reliability can be entered and appear under column 326.

With respect to phase 0.3, an example of a deliverable is identify relevant ongoing and completed projects on priority systems and components. Under this subphase, column 326 can include current and past actions and/or projects identified.

With respect to phase 0.4, an example of a deliverable can be quality office reviews with proposed engineering champion and both agree to form a project. Under column 326, engineering and quality jointly agree to proceed with project to next gateway can be included.

FIG. 3C illustrates pro forma form 338 for inputting or displaying set-up team information. Form 338 includes lines 340 and 342 for inputting or displaying team leader sign-off and date and quality engineering sign-off and date, respectively. The purpose of this pro forma is to establish a team with the skills and knowledge to deliver a solution to the concern in question. According to this embodiment of the present invention, the set-up team step is phase 1. Rows 344, 346, 348 and 350 include input boxes for inputting or displaying information regarding phases 1.1, 1.2, 1.3 and 1.4, respectively, of phase 1. Each row includes four columns 352, 354, 356 and 358 for inputting or displaying deliverables; tasks, data sources and analysis tools; results and comments; and deliverable completion due date, respectively.

The deliverables for phase 1.1 can include team leader identified. The tasks, data sources, and analysis tools can include supplier LED. Deliverables for phase 1.2 can include team membership consensed. The tasks, data sources or analysis tools for this phase include local management confirmation obtained. The deliverables for phase 1.3 can include names listed. The tasks, data sources and analysis tools for this phase include document name, company, position, e-mail and phone number. Deliverables for phase 1.4 can include high mileage training complete and evidence book (including reliability demo, matrix RDM) started. Column 354 can also include checkboxes for whether the task, data source or analysis tool has been completed. Form 338 can also include input boxes 358, 360 and 362 for inputting or displaying the generic timing for completion, planned completion date and actual completion date.

FIG. 4A illustrates a flowchart representation for a method 400 of determining a failure mode of a system component according to embodiments of the present invention. In this method, which is generally represented by step 204 above, the database manager 108 identifies a possible failure mode associated with the priority concern at step 402. At step 404, the database manager 108 determines if the identified failure mode is associated with low mileage factors. If the failure mode is not associated with low mileage factors, then the database manager 108 determines the contributory noise factors associated with the identified failure mode at step 406. In one embodiment of the present invention, contributory noise factors may be determined by reproducing noise factors such as vibration, wear, customer usage, external factors (such as climate and road conditions) or internal factors (such as the operation of neighboring system components). Each noise factor producing the failure mode conditions may be documented at the database manager 108 to be included in a complete priority concern description for guiding further analysis of the failure mode. If the failure mode is associated with low mileage factors, then the database manager 108 determines a low mileage concern resolution process, such as Six Sigma or other such processes that are well known in the art, for addressing the priority concern at step 408.

FIG. 4B depicts pro forma form 412 for inputting and displaying detail high mileage and time-in-service failure modes identify noises. This step is considered phase 2 of this embodiment of the present invention. The purpose of form 412 is to identify and develop a detailed understanding of the failure modes associated with the concerns identified in phase 0. Form 412 includes lines 414 and 416 for inputting and displaying team leader sign-off date and quality engineering sign-off and date, respectively. Form 412 includes several rows corresponding to different subphases of phase 2, although row 418 is not attributed to a subphase specifically, but is used to input information pertaining to the teams's review of phase 0 data analysis. Rows 420, 422, 424, 426, and 428 are directed at phases 2.1, 2.2, 2.3, 2.4, and 2.5, respectively. Each row has four columns 430, 432, 434 and 436 for deliverables; tasks, data sources and analysis tools (completed Y/N or unavailable); results and comments and deliverable completion due date, respectively.

The deliverable for phase 2.1 can be team develops detailed understanding of failure modes with scope. The information input or displayed under column 432 for phase 2.1 can be customer contact plan, failed parts, failed competitor parts, problem assessed in vehicle, and hazard analysis (other than warranty). The deliverable for phase 2.2 can be, if low mileage failure modes are discovered in phase 2.1, reallocate to existing concern resolution activities. The deliverables for phase 2.3 can be kick-off of BIC applications, benchmark study to identify further information for problem description. The information under column 432 can be identify BIC and/or BIF and order BIC parts. The deliverable under phase 2.4 can be high mileage contributory noise factor generated and documented. The information under column 432 can be piece-to-piece variation, wear-out, customer usage and duty cycle, external (climate and road conditions), and internal (due to neighboring subsystems). The deliverable under phase 2.5 can be problem description completed. The information under column 432 for phase 2.5 can be problem statement and vehicle lines accredited. FIG. 4B can also include the boxes 438, 440 and 442 for inputting or displaying the generic time for completion, phase planned completion date, and phase actual completion date.

FIG. 4C depicts pro forma form 444 for phase 3, i.e., analyze failure mechanism. The purpose of phase 3 can be two-fold. One is to understand and document the physics of the failure mechanism. Two is to determine the impact on the quality metrics that resolve the concern will have. Form 444 includes lines 446 and 448 for inputting team leader sign-off and date and quality engineering sign-off and date, respectively. Form 444 includes row 450 for inputting information relating to team review for correct skill base and row 452 for phase 3.1, row 454 for phase 3.2, row 456 for phase 3.3, row 458 for phase 3.4, row 460 for phase 3.5, and row 462 for phase 3.6. Each row includes four columns 464, 466, 468 and 470 for inputting and displaying deliverables; tasks, data sources and analysis tools (completed Y/N no available); comments, and deliverable completion due, respectively.

The deliverables for phase 3.1 can be failure mechanisms analyzed, understood and documented; and team develops detailed understanding of failure modes with scope. The information under column 466 for phase 3.1 can be root cause for each failure mode, root cause added to G8D documentation, FMEA updated for new failure modes. The deliverable for phase 3.2 can be magnitude of specific concern addressed by team. The information under column 466 can be R/1000, CPU, TGW, customer satisfaction, breakdowns, and other. The deliverable for phase 3.3 can be reviewed and reassess the violability of the project agreement by quality and engineering to continue to proceed with project. The information under column 466 can be current and past efforts reviewed and engineering and quality agree to proceed. The deliverable for phase 3.4 can be potential fast track solutions identified from BIC benchmarking. The information under column 466 can be alternative design concepts identified and feasibility assessed. The deliverable for phase 3.5 can be pass on failure mode and root causes to all relevant programs. The data under column 466 can be program and engineering organizations informed. The deliverable for phase 3.6 can be timing plan established for phases 4-9 that will activate year-end implementation. The information under column 466 can be timing plan established for phases 4-9. Form 444 can also include data input boxes 472, 474 and 476 for inputting generic timing for completion, phase planned completion date and phase actual completion date.

After determining the contributory noise factors associated with the identified failure mode at step 406, the database manager 108 determines at least one benchmark goal for a corrective design for addressing the priority concern at step 410. In preferred embodiments of the present invention, a benchmark goal may be determined by identifying a "best-in-class" system component. A best-in-class system component may include a system component that does not exhibit known time-in-service/mileage priority concerns and that is unrelated to the system comprising the concern resolution process system component. However, the best-in-class system component may be chosen as such because of shared architectural attributes or other commonalities with the concern resolution process system component. In some cases, accelerated priority concern resolution may be possible as a result the establishment of benchmark goals. The database manager 108 comprises pro forma forms for displaying failure mode identification data according to method 400 as seen in FIGS. 4B and 4C.

Figure 5C:
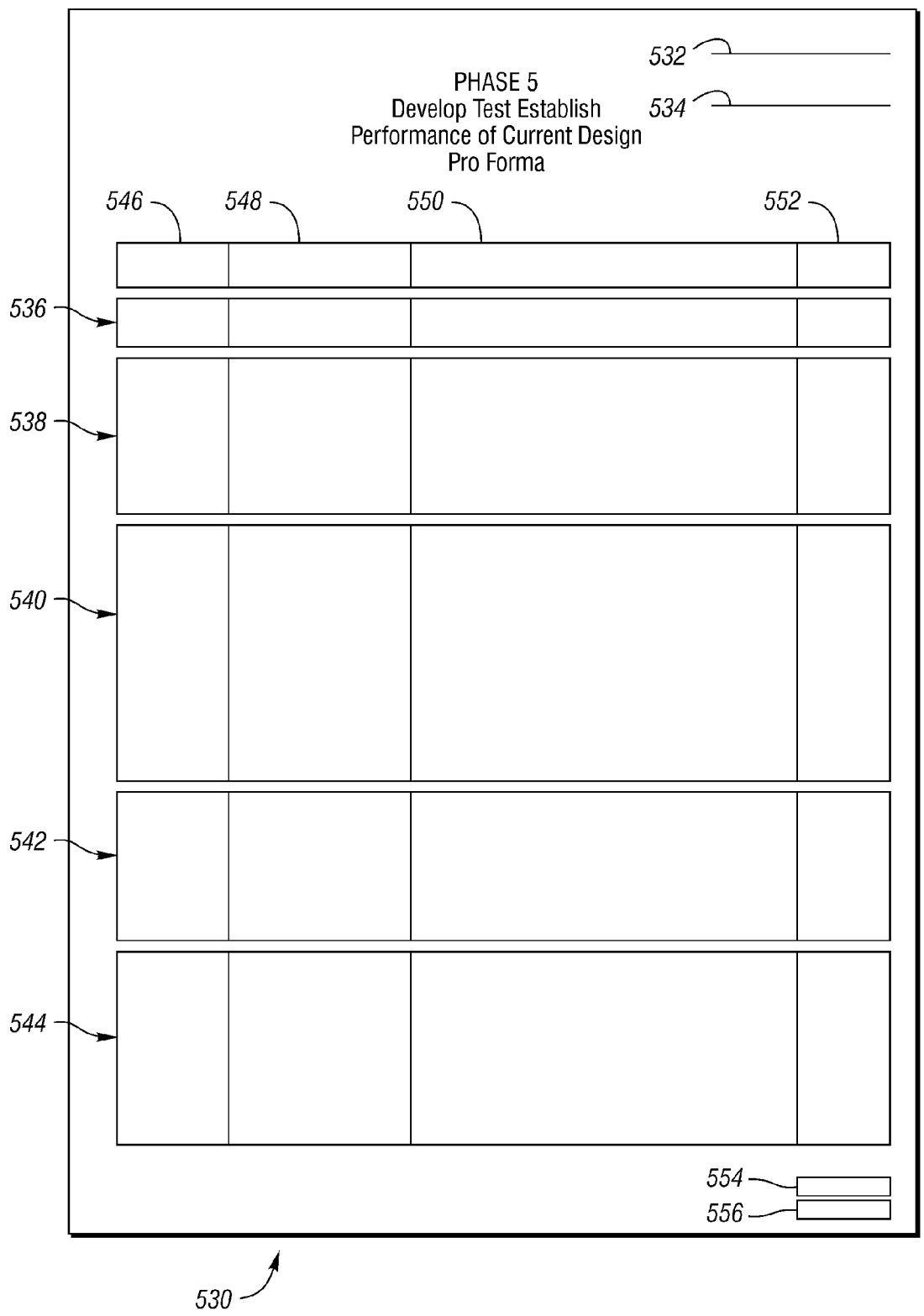
FIG. 5C illustrates a pro forma form for displaying inputted data according to FIG. 5A.

FIG. 5A illustrates a flowchart representation for a method 500 of establishing corrective design goals for a corrective system component design according to embodiments of the present invention. In this method, which is generally represented by steps 206 and 208 above, the database manager 108 determines design goals for the corrective design at step 502. In preferred embodiments of the present invention, the database manager 108 determines design goals by determining any mandatory industry design comprises pro forma forms for displaying corrective design goal data according to method 500 as seen in FIGS. 5B and 5C.

FIG. 5B depicts pro forma form 506 for displaying and inputting data for phase 4, i.e., establishing SDS, design guide, and WCR compliance. Blanks 508 and 510 are for team leader sign-off and date, and quality engineering sign-off and date, respectively. The purpose of phase 4 is to identify and correct issues that resulted from: (1) non-compliance with existing requirements; (2) requirements not in place when design was released; and (3) inadequate requirements. Form 506 includes data input boxes 526 and 528 for inputting and displaying planned completion date and actual completion date. The matrix represented by columns 518, 520, 522, and 524 and rows 512, 514 (phase 4.1) and 516 (phase 4.2) can include the information found in Table 1.

TABLE 1

| | Deliverables (518) | Tasks, Data Sources, Analysis Tools (Y/N or N/A) (520) | Comments (522) | Due Date (524) |
|---|---|---|---|---|
| 512 | Team Reviewed for correct skill base. | | | |
| 514 | Phase 4.1 Identify and document system/components that exhibit non-compliance with SDS, WCR, Design Guide (Attach current SDS, WCR. Design Guide Requirements relevant to the failure mode(s) being addressed) | WCR Compliance analyze SDS Compliance analyze Design Guide Compliance analyze Compatibility of SDS/WCR/Design Guide to failure mechanism (Would current WCR/SDS/Design Guide requirements prevent the failure mode from getting to the customer? Are there conflicting or ambiguous requirements?) | | |
| 516 | Phase 4.2 Develop action plan to achieve compliance and/or strengthen requirements | Document work plan to achieve compliance with existing SDS/WCR/Design Guide requirements Team with document upgrades to SDS/WCR/Design Guide requirements in Phase 8 | | | standards that may apply to the system component design. Therefore, step 502 may include determining a plan for achieving compliance with mandatory industry design standards.

At step 504, the database manager 108 establishes the performance of the current, in-service system component. In preferred embodiments of the present invention, the database manager 108 determines a test for reproducing the failure mode as the failure mode would occur during in-service conditions. The database manager- 108 documents the test results to establish the performance of the current, in-service system component. The database manager 108

FIG. 5C depicts pro forma form 530 for displaying and inputting data for phase 5, i.e., developing test establish performance of current design. Blanks 532 and 534 are for team leader sign-off and date, and quality engineering sign-off and date, respectively. The purpose of phase 5 is to ensure that there is test which is capable of reproducing the failure mode exactly as it occurs in the field. Form 530 includes data input boxes 554 and 556 for inputting and displaying planned completion date and actual completion date. The matrix represented by columns 546, 548, 550 and 552 and rows 536, 538 (phase 5.1), 540 (phase 5.2), 542 (phase 5.3), 544 (phase 5.4) can include the information found in Table 2.

TABLE 2

| | Deliverables (546) | Tasks, Data Sources, Analysis Tools (Y/N or N/A) (548) | Comments (550) | Due Date (552) |
|---|---|---|---|---|
| 536 | Team Reviewed for correct skill base. | | | |
| 538 | Phase 5.1 Confirm a test exists that reproduces the failure mode | Existing test available New/modified test developed | | |

TABLE 2-continued

| Deliverables (546) | Tasks, Data Sources, Analysis Tools (Y/N or N/A) (548) | Comments (550) | Due Date (552) |
|---|---|---|---|
| as it occurs in the field. Where no test exists, then team is required to develop and document a new test (added by PAV/Suppliers) | | | |
| 540 Phase 5.2 Noise factors that contributed to high mileage/time-in-service failures are incorporated into test documentation (Begin Reliability and Robustness Checklist, and update RDM) | N1: Piece-to-piece variation N2 Wear-out N3: Customer usage/duty cycle N4: External (climate and road conditions N5: Internal (due to neighboring subsystems) | | |
| 542 Phase 5.3 Performance criteria identified and incorporated in RDM and test documentation | Definition of "failure" documented Performance criteria to pass test (if known) | | |
| 544 Phase 5.4 Performance of current design established and documented via testing | Carry out test Analyzed results Compare results to performance criteria Document baseline performance (and BIC if tested) in RDM | | |

Figure 6B:
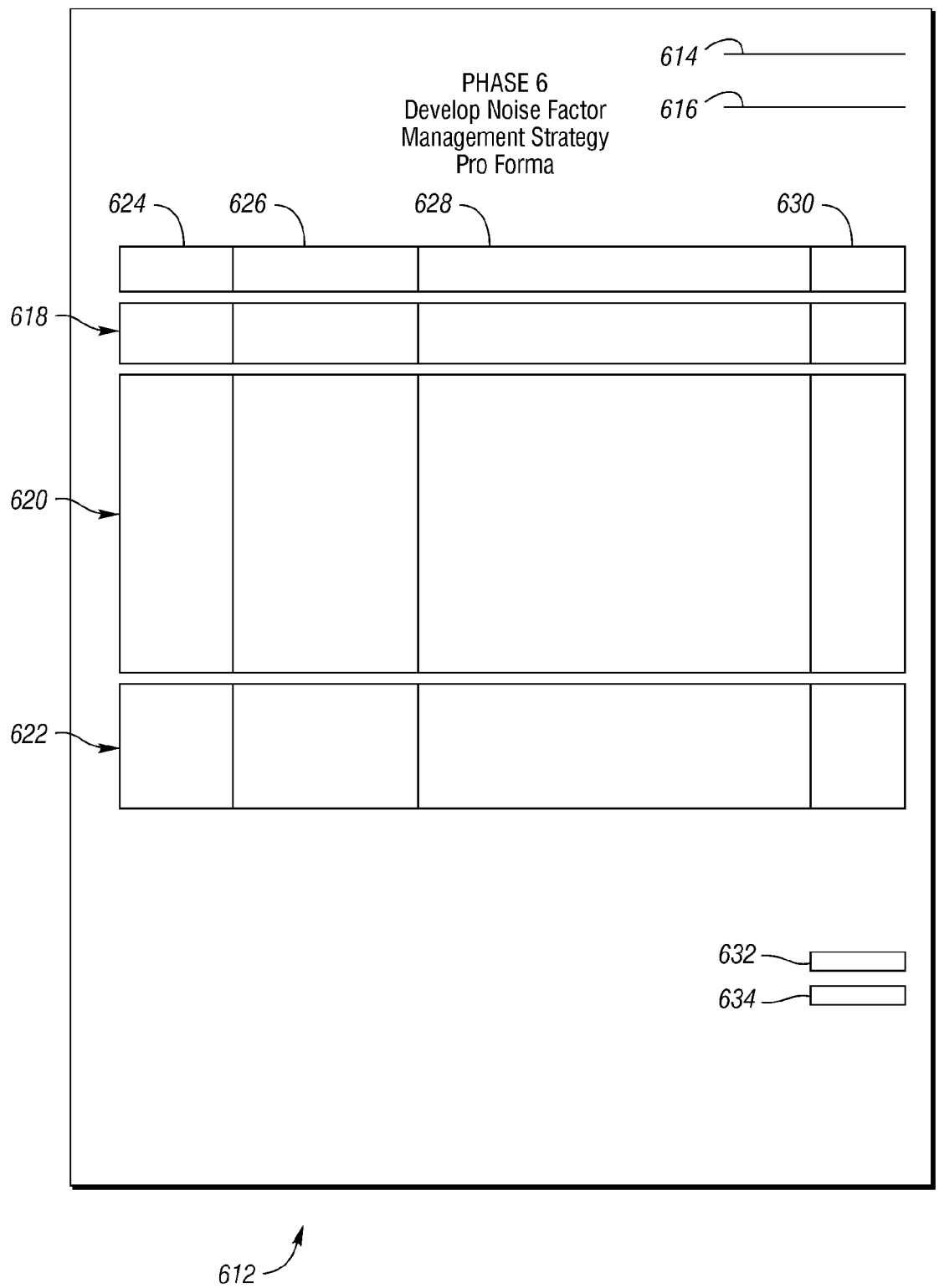
FIG. 6B illustrates a pro forma form for displaying inputted data according to FIG. 6A.

FIG. 6A illustrates a flowchart representation for a method 600 of determining a corrective design for a system component according to embodiments of the present invention. In this method, which is generally represented by step 210 above, the database manager 108 determines a noise factor management strategy for addressing the noise factors identified in FIG. 4A above at step 602. In one embodiment of the present invention, the noise factor management strategy may include a change in system component technology, a recommendation to make the system component design more robust, a plan to remove or reduce a noise factor, determining a noise factor compensation device or any combination thereof. At step 604, the database manager 108 determines a corrective system component design for addressing the priority concern. Continuing at step 606, the database manager 108 establishes the performance of the corrective design with respect to the current, in-service system component. The new design is selected to address the observed failure mode and to prevent the creation of new failure modes. In one embodiment of the present invention, the corrective design is tested and the testing results are analyzed by the database manager 108 to determine whether the design meets the standards set in FIG. 5A before the corrective design is put into production for replacing the current, in-service system component. At step 608, the recommendations of the concern resolution project are institutionalized for future reference and possible secondary usages. In one embodiment of the present invention, the corrective system component design may be carried forward for incorporation into future systems. The concern resolution project team may evaluate the effectiveness of the concern resolution process to sustain the improvements resulting from the determination of a corrective system component design in step 610. Step 610 may include evaluating the effectiveness of the corrected system component design in field usage, identifying future systems where the corrective design may be incorporated and identifying opportunities where the process of determining the corrective design may be replicated. The database manager 108 comprises forms for displaying corrective design recommendations and project evaluation data according to method 600 as seen in FIGS. 6B-6E.

FIG. 6B depicts pro forma form 612 for displaying and inputting data for phase 6, i.e., developing noise factor management strategy. Blanks 614 and 616 are for team leader sign-off and date, and quality engineering sign-off and date, respectively. The purpose of phase 6 is to identify what D&R and manufacturing actions needed to address the significant noise factors. Form 612 includes data input boxes 632 and 634 for inputting and displaying planned completion date and actual completion date. The matrix represented by columns 624, 626, 628 and 630 and rows 618, 620 (phase 6.1) and 622 (phase 6.2) can include the information found in Table 3.

TABLE 3

| Deliverables (624) | Tasks, Data Sources, Analysis Tools (Y/N or N/A) (626) | Comments (628) | Due Date (630) |
|---|---|---|---|
| 618 Team Reviewed for correct skill base. | | | |
| 620 Phase 6.1 Develop noise factor management strategy | A: Change technology B: Make design robust C: Remove/reduce noise D: Compensation device | | |

TABLE 3-continued

| Deliverables (624) | Tasks, Data Sources, Analysis Tools (Y/N or N/A) (626) | Comments (628) | Due Date (630) |
|---|---|---|---|
| | E: Disguise the problem Reliability and robustness checklist updated with noise factor management strategy | | |
| 622 Phase 6.2 Phase 7 test plan initiated and critical path elements identified with timing | | | |

Figure 6C:
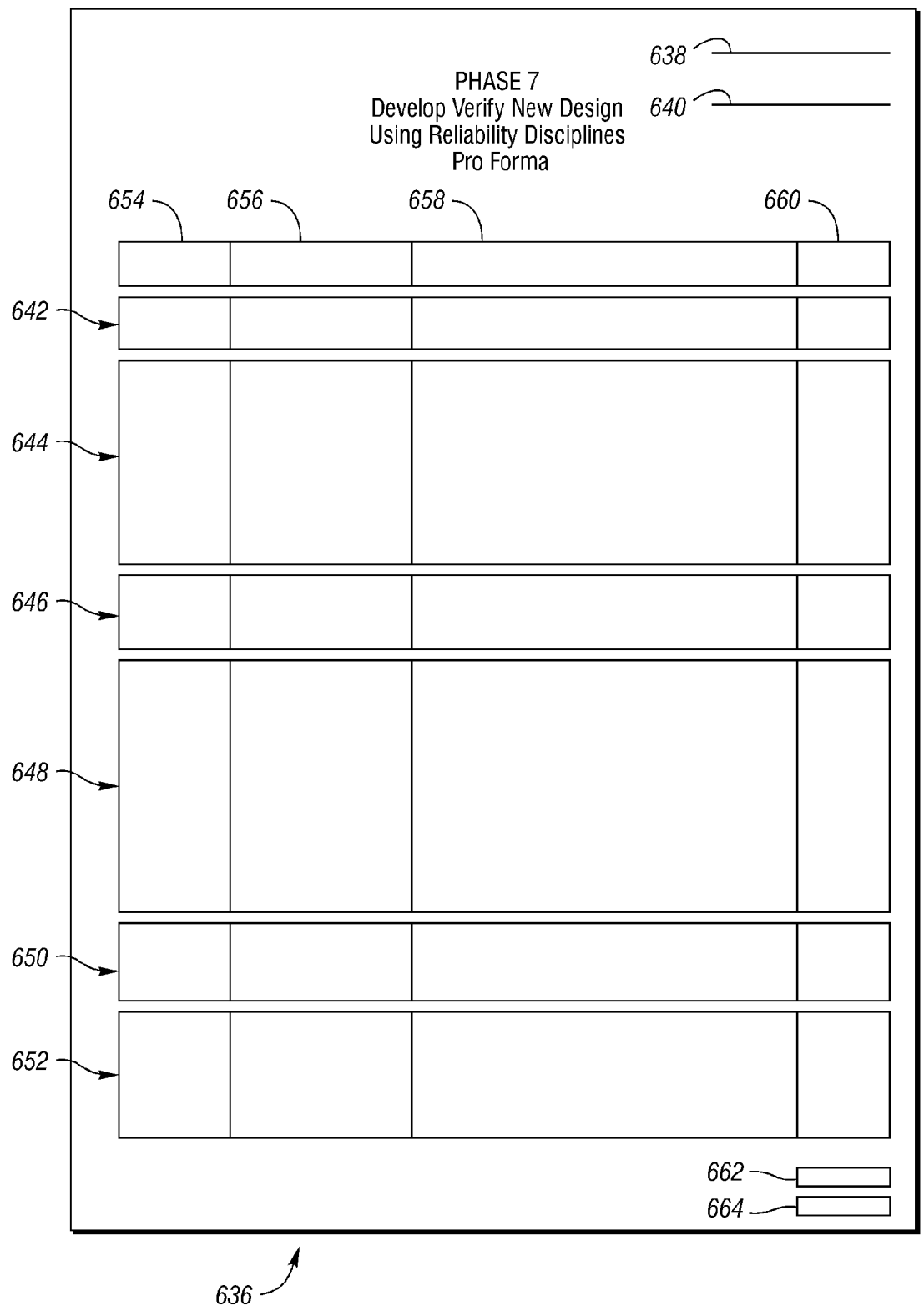
FIG. 6C illustrates a pro forma from for displaying inputted data according to FIG. 6A.

FIG. 6C depicts pro forma form 636 for displaying and inputting data for phase 7, i.e., developing verify new design using reliability disciplines. Blanks 638 and 640 are for team leader sign-off and date, and quality engineering sign-off and date, respectively. The purpose of phase 7 is to develop and verify a design that is robust to the identified noise factors. Form 636 includes data input boxes 662 and 664 for inputting and displaying planned completion date and actual completion date. The matrix represented by columns 654, 656, 658 and 660 and rows 642, 644 (phase 7.1), 646 (phase 7.1), 648 (phase 7.2), 650 (phase 7.3) and 652 (phase 7.4) can include the information found in Table 4.

FIG. 6D depicts pro forma form 666 for displaying and inputting data for phase 8, i.e., institutionalizing recommendations and lessons learned. Blanks 668 and 670 are for team leader sign-off and date, and quality engineering sign-off and date, respectively. The purpose of phase 8 is to prevent the concerns from reoccurring by insuring that all recommendations and lessons learned are institutionalized. Form 666 includes data input boxes 684 and 686 for inputting and displaying planned completion date and actual completion date. The matrix represented by columns 676, 678, 680 and 682 and rows 672 and 674 (phase 8.1) can include the information found in Table 5.

TABLE 4

| Deliverables (654) | Tasks, Data Sources, Analysis Tools (Y/N or N/A) (656) | Comments (658) | Due Date (660) |
|---|---|---|---|
| 642 Team Reviewed for correct skill base. | | | |
| 644 Phase 7.1 New design developed using FPDS Reliability Disciplines Documented proof of adherence to Reliability Disciplines Test timing plan | New design selected and FPDS disciplines (DOE, Campaign Prevent, etc.) applied as appropriate to prevent creation of new failure modes Business care complete and funding & authorization secured Test timing plan complete | | |
| 646 Launch Review Launch Phases | Launch Phase 0 Completed Launch Phase 1 Completed | | |
| 648 Phase 7.2 New design tested, results analyzed and documented If design does not meet standard, re-design work plan documented | Carry out tests Analyze results Compare results to performance criteria, BIC & baseline design Re-design work plan (revisit business case as required) Document final results in RDM | | |
| 650 Phase 7.3 Service Fix | Service fix plan for current and past models Existing service parts obsolescence plan | | |
| 652 Phase 7.4 New design signed-off for release into production Complete RDM | Sign-off & RDM documentation Compliance Plan (Ph 4.2) achieved? Confirm new design meets service requirements | | |

TABLE 5

| Deliverables (676) | Tasks, Data Sources, Analysis Tools (Y/N or N/A) (678) | Comments (680) | Due Date (682) |
|---|---|---|---|
| 672 Launch complete Launch Phase 5 | Launch Phase 2 & 3 completed Launch Phase 4 initiated | | |
| 674 Phase 8.1 Recommendations institutionalized (Supplier document updates, while important and they should be documented in this phase, are not sufficient for this deliverable) (Documents that are proprietary to the suppliers do not need to be attached) | Pass new design into forward model program Review all programs Ensure Campaign Prevent Specialist awareness for fresh eyes reviews Global 8D Completed Use project knowledge & lessons learned to update Knowledge Based Engineering (KBE) database. Update WCR Update appropriate core books in the product Development Electronic Library (PDEL) -CETP -SDS -DVP -FEMA -Design Guide Update ES Manufacturing process Control System Updated | | |

FIG. 6E depicts pro forma form 688 for displaying and inputting data for phase 9, i.e., the "make good" assessment plan. Blanks 690 and 692 are for team leader sign-off and date, and quality engineering sign-off and date, respectively. date and actual completion date. The matrix represented by columns 700, 702, 704 and 706 and rows 694 (phase 9.1), 696 (phase 9.2) and 698 (phase 9.3) can include the information found in Table 6.

TABLE 6

| Deliverables (700) | Tasks, Data Sources, Analysis Tools (Y/N or N/A) (702) | Comments (704) | Due Date (706) |
|---|---|---|---|
| 694 Phase 9.1 Update Phase 3.2 project impact as required | Phase 3.2 deliverable updated in light of actions taken and strength of RDM evidence | | |
| 696 Phase 9.2 Develop "Make Good" plan that will (1) evaluate the effectiveness of the changes in the field (evaluation will be done with hazard plots and using a SPC approach by month of production on warranty and TGW data with at least 7 MOP); (2) ensure that future products are protected ("sustainability"); and (3) identify opportunities in other vehicle lines ("replication") | Plan to evaluate effectiveness in field established Forward model programs affected have been identified along with the program timing Forward model programs commit to sign-off to new RDM standard developed by this project Identify other opportunities for which the changes can be "replicated" Evidence book complete | | |
| 698 Phase 9.3 Complete evidence book with Executive Summary and Sign-off page | | | |

The purpose of phase 9 is to develop a "make good" plan that will evaluate the effectiveness of the changes in the field, sustain the improvements in the affected vehicle lines and their future models and identify other opportunities to replicate changes. Form 688 includes data input boxes 708 and 710 for inputting and displaying planned completion The present invention has been described in relation to particular embodiments, which are intended in all respects to be illustrative rather than restrictive. Alternate embodiments will become apparent to those skilled in the art to which the present invention pertains without departing from its spirit and scope. Accordingly, the scope of the present invention is described by the appended claims and supported by the foregoing description.

The invention claimed is:

1. A method of determining a corrective design for a system component exhibiting time-in-service reliability concerns, the method comprising the steps of:
   establishing a plurality of remote customer databases for collecting service data for a system component;
   receiving at a centralized database during a predetermined time period at least one parameter representative of a failure rate for the system component based on the service data;
   determining if the at least one parameter represents a system component defect;
   when the at least one parameter represents a system component defect, determining at least one failure mode of the system component based on the at least one parameter, identifying at least one contributory noise factor associated with the at least one failure mode based on the at least one parameter representative of the failure rate for the system component based on the service data, and identifying a benchmark goal for the system component from a best-in-class system component for the system component; and
   determining a corrective design for the system component based on the at least one failure mode, the at least one contributory noise factor, and the benchmark goal associated with the best-in-class system component.

2. The method of claim 1, wherein the at least one parameter represents a sampling of the service data that is sufficient to predict a system component defect.

3. The method of claim 1, wherein determining the corrective design includes determining at least one performance limit of the corrective design.

4. The method of claim 3, wherein determining the corrective design includes comparing at least one performance limit of the system component to at least one performance limit of the corrective design.

5. The method of claim 4, further including modifying the corrective design based on the comparison of the at least one performance limit of the system component to the at least one performance limit of the corrective design.

6. The method of claim 1, wherein determining the corrective design includes minimizing the effects of the at least one failure mode.

7. A method of determining a corrective design for a system component exhibiting time-in-service reliability concerns, the method comprising the steps of:
   establishing a plurality of remote customer databases for collecting service data for a system component;
   receiving at a centralized database during a predetermined time period at least one parameter representative of a failure rate for the system component based on the service data;
   determining if the at least one parameter represents a system component defect;
   when the at least one parameter represents a system component defect, determining at least one failure mode of the system component based on the at least one parameter; and
   determining a corrective design for the system component based on the at least one failure mode,
   wherein a predetermined time period sufficient for the at least one parameter to represent a sampling of the service data that is sufficient to predict a system component defect is three years.

8. The method of claim 7, wherein the plurality of remote customer databases and the centralized database comprise a dealer network.

9. The method of claim 7, wherein the at least one parameter is indicative of an increasing failure rate for the system component.

10. The method of claim 7, wherein the at least one parameter is indicative of a steady failure rate for the system component.

11. A method of determining a corrective design for a system component exhibiting time-in-service reliability concerns, the method comprising the steps of:
    establishing a plurality of remote customer databases for collecting service data for a system component;
    receiving at a centralized database during a predetermined time period at least one parameter representative of a failure rate for the system component based on the service data;
    determining if the at least one parameter represents a system component defect;
    when the at least one parameter represents a system component defect, determining at least one failure mode of the system component based on the at least one parameter, identifying at least one contributory noise factor associated with the at least one failure mode based on the at least one parameter representative of the failure rate for the system component based on the service data, and identifying at least one performance limit of the system component; and
    determining a corrective design for the system component based on the at least one failure mode, the at least one contributory noise factor, and the at least one performance limit of the system component.

12. A method of determining information relating to a failure mode for a defective system component exhibiting time in service reliability concerns, said method comprising the steps of:
    receiving at least one parameter representing a system component defect, said at least one parameter being based on service data for a system component collected at a plurality of remote customer databases during a predetermined time period;
    determining a failure mode of the system component based on the at least one parameter; and
    identifying at least one contributory noise factor associated with the at least one failure mode based on the at least one parameter representative of the failure rate for the system component based on the service data; and
    identifying a benchmark goal for the system component from a best-in-class system component for the system component;
    transmitting the at least one contributory noise factor and the benchmark goal to a remote terminal for use in determining information relating to a failure mode.

13. The method of claim 12, wherein the at least one parameter represents a sampling of the service data that is sufficient to predict a system component defect.

14. The method of claim 13, wherein a predetermined time period sufficient for the at least one parameter to represent a sampling of the service data that is sufficient to predict a system component defect is three years.

15. The method of claim 12, wherein the at least one parameter is indicative of an increasing failure rate for the system component.

16. The method of claim 12, wherein the at least one parameter is indicative of a steady failure rate for the system component.

17. An apparatus for determining a corrective design for a system component exhibiting time-in-service reliability concerns, the apparatus comprising:

a database manager operable to receive during a predetermined period of time at least one parameter representative of a failure rate for the system component;

the database manager being configured to determine if the at least one parameter represents a system component defect;

when the at least one parameter represents a system component defect, the database manager being configured to determine at least one failure mode of the system component based on the at least one received parameter, identify at least one contributory noise factor associated with the at least one failure mode based on the at least one parameter representative of the failure rate for the system component based on the service data, and identify a benchmark goal for the system component from a best-in-class system component for the system component; and the database manager being further configured to determine a corrective design for the system component based on the at least one failure mode, the at least one contributory noise factor, and the benchmark goal associated with the best-in-class system component.

* * * * *